United States Patent Office 3,250,701
Patented May 10, 1966

3,250,701
STABILIZATION OF DESALINATION MEMBRANES
Ellwood R. Watson, Glendora, Harry W. Heidsman, West Covina, and Bertram Keilin, Pasadena, Calif., assignors, by direct and mesne assignments, of one-half to Aerojet-General Corporation, Sacramento, Calif., and one-half to the United States of America as represented by the Secretary of the Interior
No Drawing. Filed Sept. 15, 1965, Ser. No. 489,769
8 Claims. (Cl. 210—22)

This invention relates to the demineralization of aqueous solutions for removing purified water and concentrating feed waters. In particular, this invention relates to a method for operating reverse osmosis desalination cells for removing water from aqueous solution whereby the membranes utilized in reverse osmosis cells are stabilized.

The reverse osmosis process (sometimes known as ultrafiltration) for demineralization of aqueous solutions involves the use of a driving pressure in excess of the osmotic pressure (approximately 350 p.s.i. for sea water) to force pure water through a selective membrane which is capable of rejecting the dissolved salts. The flow of water under the applied hydrostatic pressure is in a direction opposite to that normally observed in an osmotic experiment, in which the driving force is the solute concentration gradient between opposite sides of the osmotic membrane.

Certain membranes that are uncharged, such as cellulosic esters, are selectively permeable to water, rejecting solutes. Although relatively high pressures of the order of 600 to 1,500 p.s.i. or higher are required for reverse osmosis of sea water, good salt rejection and reasonable flux rates have been economically obtained. The development of suitable membranes over recent years has progressed rapidly. Early reports of the reverse osmotic phenomenon by Reid et al. in J. Appl. Poly. Sci., vol. 1, page 133 (1959); vol. 2, page 264 (1959); and vol. 4, page 354 (1960), led workers in the field to seek development of better semipermeable osmotic films for high salt rejection and corresponding high throughput or permeation flux rate for water.

Biget reported in Ann. Chim. (12), 5, 66 (1950) the successful preparation of cellulose acetate membranes with aqueous solutions containing metallic perchlorates, especially $Mg(ClO_4)_2$, and had observed that 97% of the dissolved salt was removed from salt solutions. A significant advance in the desalination arts was made when Loeb et al. cast cellulose acetate membranes from a casting solution comprising a film-forming cellulosic ester and an aqueous solution of $Mg(ClO_4)_2$ in an organic solvent, such as acetone. The methods for membrane preparation and for their use in a reverse osmosis process for desalination are described in U.S. Patents 3,133,132 and 3,133,137, issued May 12, 1964. The Loeb membranes displayed a salt rejection of better than 90% and water permeation flux rates of greater than 10 gallons per square foot of membrane surface per day.

In normal operation, the reverse osmosis desalination cell is maintained in continuous operation. The feed solution is introduced under pressure at the high pressure side of the cell and contacted with the membrane surface. The feed solution is circulated across the membrane surface so as to minimize the effects of boundary layer phenomena, and to decrease the solution concentration at the interface of the membrane. A portion of the concentrated feed solution is continuously withdrawn from the cell and may be discarded or utilized as a concentrate. Water passes through the selective osmotic membrane into the low pressure side of the cell and is withdrawn from the system, usually as the desired product. The thin membranes would normally rupture from the high pressure differential between the input and output sides of the cell were it not for the use of a porous backing between the membrane and the low-pressure side to provide a support for the thin film.

During the operation of reverse osmosis cells the flux rate, or rate of flow of water through the separation membrane, is known to decrease with continued operation of the cell over a long period of time. Concurrently, an increase in the solute content of the product stream was also noted. Over a period of continuous operation of several days it was observed that the flux rate for water decreased by one half to two thirds of its initial value.

It has been discovered that the flux rate may be maintained at a high level by intermittently relaxing the pressure applied to the feed solution on the upstream side of the reverse osmosis cell and then repressurizing the system to resume continuous operation. The exact nature of the mechanism for stabilizing the membranes by such interruption of continuous operation is not completely understood. However, it is believed that the degradation of the membranes is related to the plastic flow of the polymer under applied pressure which tends to compress the highly-porous material, thus causing the fresh water flow through the membranes to decrease. The periodic relaxation of upstream pressure for a period of about one hour for each day of operation is believed to permit elastic rebound of the structure before a permanent plastic deformation takes place.

Accordingly, it is an object of this invention to present a novel process for operating reverse osmosis solution separation cells. In particular, it is an object of the present invention to demonstrate a method for intermittently relaxing the applied upstream pressure on a feed stream to be desalinated thereby permitting continued operation of the cells under high water flux rates and with high solute removal.

A number of polymers have been shown to exhibit selective properties for removing a solvent from a solute by reverse osmotic flow. Aside from the well-known cellulosic ester polymer membranes, poly (ethylene glycol monomethacrylate) has been utilized as a selective material for ion and water flux. Ion-exchange membranes are also suitable, since if a membrane is impermeable to either positive or negative ions, the requirement of electrical neutrality prevents ions of opposite charge from passing through the membrane in reverse osmosis. While the examples given in this description of the invention are pertinent to the cellulosic ester membranes, the scope of the invention is considered to encompass all reverse osmotic films and barriers.

Due to the relative ease of casting procedures, most membrane shapes for reverse osmosis cells have been restricted to flat configurations. However, tubular membranes have been successfully employed for desalination and are also contemplated within the inventive concept.

The particular materials disclosed by Loeb et al. in Patents 3,133,132 and 3,633,137 are not the only ones suitable for use with the instant invention. Successful cellulosic ester membranes have been prepared using other swelling salts than magnesium perchlorate, notably $ZnCl_2$, and other organic solvents than acetone, e.g., dioxane, and have been reported by Keilin in "The Mechanism of Desalination by Reverse Osmosis" in Research and Development Progress Report No. 84 (PB 181,571 available through the U.S. Department of Commerce Clearinghouse). The swelling salts included in the casting solution during film preparation may be those containing $Mg^{++}$, $Zn^{++}$ or $Be^{++}$ cations or $ClO_4^-$ or halide anions, or combinations of these ions. Film thickness may vary considerably, but most workers in the art employ 0.004 to 0.010 inch membranes for their desalination cells.

The fabrication and use of the semipermeable osmotic membranes in reverse osmosis processes has been generally described, and a specific embodiment of the instant invention will now be given.

EXAMPLE

Preparation of desalination membrane

A casting solution containing 22.2 grams of cellulose acetate, 66.7 grams of acetone, 1 gram of zinc bromide, 1 gram of zinc chloride, and 1 gram of magnesium perchlorate was prepared and agitated overnight. After standing at room temperature for 6–8 hours to permit trapped air bubbled to reach the surface, the solution was cooled overnight at a temperature of −8° to −13° C. Glass casting plates 18″ x 22″ x ½″ were chilled overnight at a temperature of −8° to −13° C. prior to the casting process. During casting the solution is poured carefully into a reservoir at one end of the glass plate beside a stainless steel casting knife. The knife is ⅛″ x 1″ x 17″ with a 30° beveled edge, and the clearance is set to provide a film thickness of 0.010 inch. The casting knife is pulled down the length of the glass plate at a constant speed and pressure.

The glass plates and fresh film are placed in a closed deep freezer at a temperature of −8° to −13° C., and the acetone solvent is permitted to evaporate. The film is allowed to "dry" approximately 10 minutes until the film is clear in appearance.

The film-containing glass plates are then immersed in plastic trays containing deionized water at about 3° C. The film is left in the cold water until it floats free from the glass plate.

The membranes are removed from the cold-water immersion trays and sandwiched between 23″ x 17″ x ⅛″ aluminum sheets and immersed in a heat-treatment water bath for 15 minutes at 84° C. The finished membranes may then be stored in deionized water and sealed from air for an indefinite period.

Ninety membranes, measuring 17″ x 22″ x 0.010″, are assembled in a stacked arrangement similar to that shown in the Loeb et al. patents in a desalination unit having about 100 square feet of available surface. This unit has a nominal output of 1000 gallons of fresh water per day.

Operation of the desalination unit

During normal operation of the feed solution is introduced at 730–770 pounds per square inch (gage) pressure and under normal ambient temperature of 65° to 80° F. The normal average flow rate is 1.8–2.3 gallons per minute. Table 1 shows the composition of process streams during a typical run.

TABLE 1

|  | Raw water | Composite product | Waste brine |
|---|---|---|---|
| pH | 7.2 | 6.9 | 7.4 |
| Analysis (parts per million by weight): | | | |
| Total solids | 4,330 | 250 | 7,271 |
| Total dissolved solids | 4,040 | | 7,212 |
| Na | 925 | | 97.1 |
| Ca | 320.4 | | 6.9 |
| Mg | 186.2 | | 3.3 |
| Cl | 1,211.9 | | 144.3 |
| SO₄ | 1,367 | | 1.2 |
| B | 0.025 | | 0.02 |
| F | 1.0 | | 0.01 |
| K | 10.5 | | 0.1 |
| Fe | 0.15 | | |
| CO₃ | 0.1 | | 0.1 |
| HCO₃ | 211.6 | | 11 |
| NO₃ | 1.5 | | 2 |
| Silicate | 0.01 | | 0.01 |
| Mn | 0.60 | | 0.01 |
| Zn | 0.06 | | 0.04 |

The starting flux rate for the desalination unit for new membranes is about 18 gallons of fresh water per square foot of membrane surface per day. During a continuous pressure test of the unit the flux dropped to 11 ga./ft.²/day by the seventh day and continued to drop to about 6 gal./ft.²/day on the sixty-third day. In using the method of this invention on identical membranes, the pressure was relaxed after the seventh day for a period and the flux rate increased from 11 to 14 gal./ft.²/day after continuous operation was resumed. During the following few days a number of interruption sequences were attempted, as set forth in Table 2.

TABLE 2

| Number of shutdowns per day | Duration of shutdown (minutes) | Cycle time (hours) | Total daily shutdown time (minutes) |
|---|---|---|---|
| 1 | 60 | 24 | 60 |
| 1 | 30 | 24 | 30 |
| 1 | 15 | 24 | 15 |
| 2 | 30 | 12 | 60 |
| 2 | 15 | 12 | 30 |
| 4 | 30 | 6 | 120 |
| 4 | 15 | 6 | 60 |

During the period between the seventh and forty-fifth days the above cycles were used intermittently to relax the input pressure from the operation pressure to ambient pressure on the forty-fifth day the final six-hour cycle sequence shown, using a fifteen minute shutdown time, was determined to be the desirable method for operating the particular cell. After this determination the flux rate was stabilized at about 11 gal./ft.²/day and no further degradation took place in the membranes, which were used at that flux rate for many days thereafter.

The interruption of the continuous operating conditions of the demineralization cell may be easily automated by use of a simple timer device. The cycle time and shutdown time may vary with membrane composition and process liquid, and the foregoing example is given by way of showing a typical embodiment of the process only. The solute used need not be salt or sea water; sucrose solutions, for instance, may be successfully dewatered using the above process wtihout departing from the scope of the invention. Also, there is no attempt to limit the inventive concept to the use of cellulosic ester polymer membranes. Any semipermeable osmotic membrane capable of rejecting solute while permitting water flow is within the scope of the invention.

The invention has been illustrated by specific example but there is no intent to limit the invention to the specific details so disclosed in the description, except insofar as set out in the following claims.

What is claimed is:

1. In the method for removing water from aqueous solutions by reverse osmosis wherein an input stream of solution to be purified is fed under pressure to one side of semipermeable osmotic membrane and water having a lessened solute content is withdrawn from an opposite side of the membrane, the improvement which comprises intermittently relaxing the pressure on the input stream whereby membrane degradation is prevented and a high water flux rate is maintained through the membrane.

2. The method according to claim 1 wherein the membrane pressure is relaxed for at least sixty minutes total time during a day's operation.

3. The method according to claim 2 wherein the membrane pressure is relaxed for about fifteen minutes during a six-hour cycle.

4. A method for removing water from aqueous solution by reverse osmosis comprising the following steps,
contacting an aqueous feed solution under substantially continuous pressure with cellulosic ester membrane surface selectively permeable to water while rejecting solutes,
recovering water having low-solute content,
recovering concentrated aqueous solution, periodically interrupting the feed solution pressure to permit membrane recovery and thereby raise average flux rates through the membrane surface substantially and, re-pressurizing the feed solution pressure to establish continuous operation.

5. The method of claim 4 wherein the aqueous feed solution comprises salt water.

6. The method of claim 5 wherein the feed solution pressure is interrupted for about sixty minutes daily.

7. The method of claim 6 wherein the feed solution pressure is interrupted about fifteen minutes each six hours.

8. The method of claim 4 wherein the cellulosic ester membrane comprises swelling-salt and cellulosic acetate.

References Cited by the Examiner

UNITED STATES PATENTS

| | | | |
|---|---|---|---|
| 3,133,132 | 5/1964 | Loeb et al. | 264—49 |
| 3,170,867 | 2/1965 | Loeb et al. | 210—22 |
| 3,206,397 | 9/1965 | Harvey | 210—22 X |

MORRIS O. WOLK, *Primary Examiner.*

E. G. WHITBY, *Assistant Examiner.*